United States Patent [19]

Inagawa et al.

[11] Patent Number: 4,700,337

[45] Date of Patent: Oct. 13, 1987

[54] CONTROL APPARATUS FOR A RECORDING MEDIUM DRIVE MOTOR IN A DIGITAL INFORMATION REPRODUCING APPARATUS

[75] Inventors: June Inagawa; Tadashi Kojima, both of Yokohama, Japan

[73] Assignee: Kabushiki Kaisha Toshiba, Kawasaki, Japan

[21] Appl. No.: 780,302

[22] Filed: Sep. 26, 1985

[30] Foreign Application Priority Data

Sep. 29, 1984 [JP] Japan ............................. 59-204861

[51] Int. Cl.⁴ .......................... G11B 7/02; G11B 17/00
[52] U.S. Cl. ........................................ 369/50; 360/59; 360/240
[58] Field of Search ..................... 369/90, 59, 240, 267

[56] References Cited

U.S. PATENT DOCUMENTS

| | | | |
|---|---|---|---|
| 4,338,683 | 7/1982 | Furukawa et al. | 369/50 |
| 4,397,011 | 8/1983 | Ogawa | 369/50 |
| 4,466,089 | 8/1984 | Wachi | 369/50 X |
| 4,539,666 | 9/1985 | Wachi | 369/50 |
| 4,543,650 | 9/1985 | Wachi | 369/50 X |

FOREIGN PATENT DOCUMENTS 58-220271 12/1983 Japan .

*Primary Examiner*—Aristotelis M. Psitos
*Attorney, Agent, or Firm*—Oblon, Fisher, Spivak, McClelland & Maier

[57] ABSTRACT

A control apparatus for a recording medium drive motor in a digital information reproducing apparatus. The apparatus controls a rotation speed of the recording medium at a prescribed constant linear velocity in using a reproduced signal from the medium without employing a detector for detecting the position of a pick-up device used therein and without being affected by an unexpected level change of the reproduced signal. The apparatus includes a motor for driving the recording medium having a digital information recorded thereon in the form of a run length limited pulse code modulation, a pick-up for reproducing a digital signal from the recording medium driven by the motor, a detector for detecting a predetermined limited cycle length of the digital signal from the reproduced signal by the pick-up, and a controller for controlling the rotation speed of the motor so that the limited run length of the reproduced digital signal is kept at a predetermined value.

4 Claims, 3 Drawing Figures

CONTROL APPARATUS FOR A RECORDING MEDIUM DRIVE MOTOR IN A DIGITAL INFORMATION REPRODUCING APPARATUS

BACKGROUND OF THE INVENTION

1. Field of the Invention

The present invention relates generally to an apparatus for controlling a rotation speed of a recording medium drive motor in an information signal reproducing apparatus.

2. Description of the Prior Art

A disc is known on which an audio signal and other information signal are digitized and recorded. An optical disc for the audio disc, for example, is known on which the audio signal is pulse code modulated and then recorded. To record a pulse code modulation (hereinafter simply refered to PCM) signal on the disc, a method of recording at a constant angular velocity (hereinafter simply refered to CAV) and a method of recording at a constant linear velocity (hereinafter simply refered to CLV) are proposed.

In the CAV system, a rotation speed of the disc drive motor is maintained constant over an entire reproduction range. While in the CLV system, it is necessary to decrease a rotation speed of the motor as a pick-up goes toward the outer periphery so that the relative speed between the disc and the pick-up, that is, a linear speed is kept constant and the clock rate of the reproduced signal is kept constant. In the CAV system, an information density in a unit rack length is lower in an outer periphery than in an inner periphery, while in the CLV system it is constant over entire range. Accordingly, the recording at CLV is preferable.

The disc on which the PCM signal is recorded at the CLV has to be reproduced at the CLV. Such a method for controlling the disc upon playback is known that a position of a pick-up is detected by a potentiometer and since the necessary rotational number becomes the inverse number of such position, the detected output is supplied to a divider so as to obtain a control information. This method, however, needs such an arrangement consisting of the position detector or potentiometer and the divider, so this leads to expensive and complex arrangement.

Therefore, it is proposed to use the reproduced signal from the disc so as to control the disc rotation at the CLV without using the detector for detecting the position of the pick-up, in order to overcome the drawbacks as mentioned above. That is, a method for obtaining a control information or data based upon the reproduced signal from the disc has been proposed. For instance, in a digital audio disc (hereinafter simply refered as DAD) on an optical signal detection system, a sync signal is accompanied in every frame, for respective digitized audio signals, i.e., the PCM signals, with a predetermined frequency. In this case, the PCM signal is recorded at the base band system which is not a carrier modulation such as amplitude and frequency modulations. The modulation method of the case is used normally such as a run length limited code.

The run length limited code modulation method is, with respect to data "1" or "0", a minimum transition interval $T_{min}$ between two data is extended to enhance the recording efficiency and a maximum transition interval $T_{max}$ therebetween is shortened to facilitate a self clock on a playback side. The PCM signal varies at its pulse waveform between $T_{min}$ and $T_{max}$, however the duty ratio of the PCM signal is kept in 50% within a predetermined successive number of the frames. While the sync signal is always formed in a waveform consisting of a pair of positive and a negative pulses of equal length, that is, 50% duty ratio in its positive and negative periods.

Then, a conventional motor speed control method has used the sync signal as the control information. However, the method has not been sufficient for the control of the motor at the CLV. Because the sync signal is not obtainable at cases such a time of starting the motor and a time of forwarding fast the pick-up. The conventional method has also same problem for signal dropouts caused, for example, by dusts or scratches on the disc.

To comply with the problem of the conventional method as mentioned above, we have developed another method for control of the motor at the CLV. The method is described in Japanese Patent Application Laid-Open No. 58-220271. In the method, $T_{max}$ of the PCM audio signal at its positive interval or negative interval is detected and then the motor speed is controlled so as the $T_{max}$ to be kept in a predetermined value. However, we have found a problem still left in the method. That is, the PCM audio signal is obtained by slicing a reproduced signal from the disc at a predetermined reference slice level. When the reproduced signal varies at its level, the positive or negative interval of the PCM signal varies in accordance with a relative change between the reproduced signal and the reference slice level.

Therefore, $T_{max}$ detected based on the interval also varies so that the motor speed is wrongly changed.

SUMMARY OF THE INVENTION

Accordingly, it is an object of the present invention to provide a control apparatus for a recording medium drive motor in a digital information reproducing apparatus in which the rotation of a recording medium can be controlled using the reproduced signal from the medium without employing a detector for detecting the position of a pick-up device used therein.

It is another object of the present invention to provide a control apparatus for a recording medium drive motor in a digital information reproducing apparatus in which a motor control information can be derived from a reproduced signal without being affected by a level fluctuation of the reproduced signal.

According to one aspect of the present invention, there is provided a control apparatus for a recording medium drive motor in a digital information reproducing apparatus comprising; motor means for driving the recording medium having a digital information recorded thereon in the form of a run length limited pulse code modulation, pick-up means for reproducing a digital signal from the recording medium driven by said motor means, means for detecting a predetermined limited cycle length of the digital signal from the reproduced signal by said pick-up means, and means for controlling the rotation speed of said motor means so that the limited run length of the reproduced digital signal is kept at a predetermined value.

Additional objects, advantages, and features of the present invention will further become apparent to persons skilled in the art from a study of the following description and of the accompanying drawings, in which:

DESCRIPTION OF THE PREFERRED EMBODIMENTS

Figure 1:
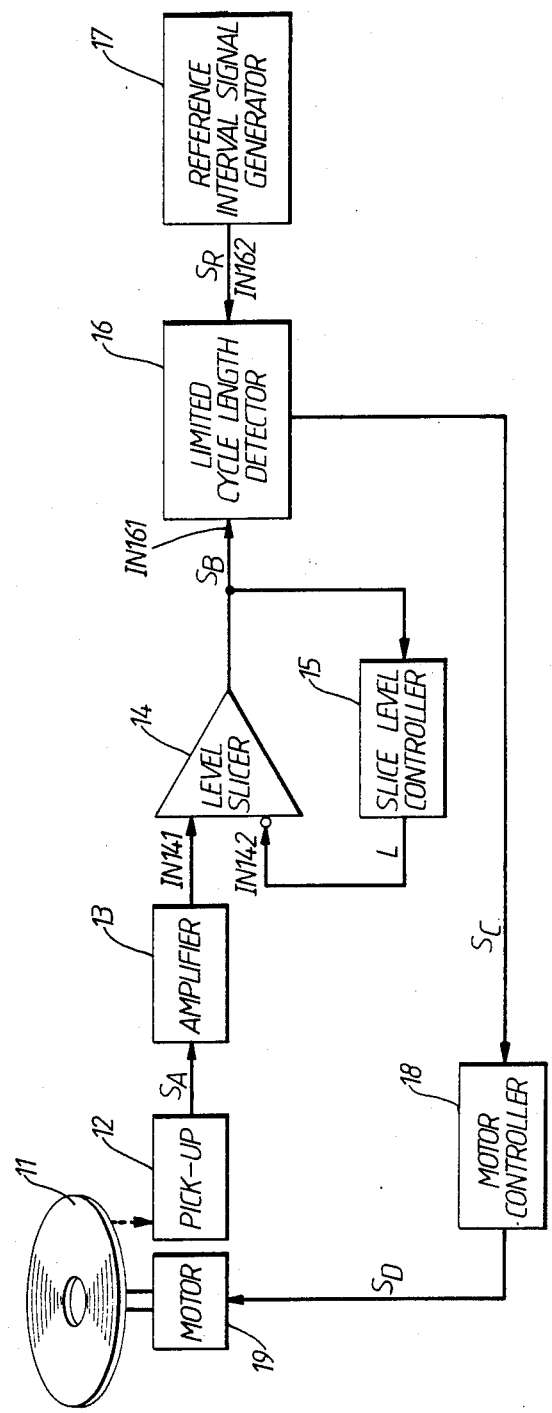
FIG. 1 is an overall block diagram showing an embodiment of the control apparatus for a recording medium drive motor in a digital information reproducing apparatus according to the present invention.

The present invention will now be described in detail with reference to the accompanying drawings, namely, FIGS. 1 to 3. Throughout the drawings, like reference numerals and letters are used to designate like or equivalent elements for the sake of simplicity of explanation.

Referring now to FIG. 1, there is shown an embodiment the control apparatus for a recording medium drive motor in a digital information reproducing apparatus according to the present invention. In the drawing, a recording medium, i.e., an optical disc 11 on which an audio signal is recorded according to the PCM configuration with a run length limited code modulation is driven by a drive motor 19. A recorded information of the disc 11 is optically reproduced by a pickup 12.

The reproduced signal $S_A$ is amplified to a prescribed level by an amplifier 13. The amplified signal $S_A$ is inputted to signal input terminal $IN_{141}$ (non-inverted) of a level slicer 14 in a form of comparator. The output signal $S_B$ of the level slicer 14 is applied to a slice level controller 15. An output, i.e., a slice level signal L generated from the level slicer 15 is applied to another input terminal, i.e., a reference input terminal $I_{142}$(inverted input) of the level slicer 14. The level slicer 15 continuously controls the slice level signal L so as the output $S_B$ of the level slicer 14 to be kept in 0 (zero) DC level during every predetermined time interval. The output signal $S_B$ is further applied to a signal input terminal $IN_{161}$ of a predetermined limited cycle length detector 16, for example, a maximum cycle length detector 16.

The maximum cycle length detector 16 is supplied to its another input terminal $IN_{162}$ with a reference interval signal $S_R$ from a reference interval signal generator 17. The maximum cycle length detector 16 examines cycle lengths of the output signal $S_B$, i.e., intervals beteen a leading edge of one positive pulse and a leading edge of a following positive pulse during a predetermined time, and then detects a maximum of the examined intervals. The maximum cycle length detector 16 can be replaced by a minimum cycle length detector. In case of the minimum cycle length detector being used, the minimum cycle length detector detects a prescribed minimum cycle length of the output signal $S_B$.

An output signal $S_C$ of the limited cycle length detector 16 is applied to a drive motor controller 18. An output signal $S_D$ of the drive motor controller 18 is applied to the drive motor 19 so as to control the rotation speed of the motor 19 at the CL. The drive motor controller 18 controls the rotation speed of the motor 19 so as the output signal $S_C$ to be kept at a predetermined value. Therefore, the disc 11 is driven at the CLV rotation speed.

As described above, a maximum cycle length of the output signal $S_B$ is detected and then used as a control information for the rotation speed of the motor 19 in this embodiment. The drive motor controller 18 controls the maximum cycle length of the output signal $S_B$ to be kept at a predetermined value.

Figure 2:
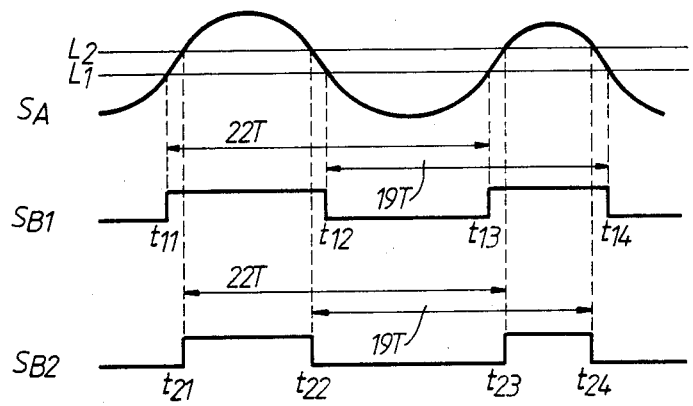
FIGS. 2 and 3 are signal waveform diagrams each being used to explain the operation of the control apparatus for a recording medium drive motor in a digital information reproducing apparatus.

FIG. 2 shows a signal waveform diagram for explaining the operation of the above embodiment shown in FIG. 1. In FIG. 2, a graph $S_A$ denotes the reproduced signal $S_A$ at the signal input terminal $IN_{141}$. While a graph $L_1$ denotes a level of the slice level signal L at a time when the disc 11 is driven in a prescribed rotation speed at the CLV as usual. The reproduced signal $S_A$ is sliced at the level slicer 14 in compared to the slice level signal L with the level $L_1$ to that the output signal $S_B$ with a waveform of a graph $S_{B1}$ in FIG. 2 is generated therefrom. The sliced output $S_{B1}$ is assumed to have the maximum cycle length 22T during a period of the timings from $t_{11}$ to $t_{13}$, but a shorter cycle length 19T during a period of the timings from $t_{12}$ to $t_{14}$ in the drawing. Where T represents a bit cell period of input data to be recorded. The output $S_{B1}$ conveying the maximum cycle length 22T is then detected at the maximum cycle length detector 16. When the level of the reproduced signal $S_A$ is lowered by any unexpected trouble, the slice level signal L is assumed to be changed to a higher level $L_2$ from $L_1$ relatively to the decrease of the reproduced signal $S_A$. Therefore, the reproduced signal $S_A$ is sliced with the higher slice level $L_2$ at the level slicer 14 so that the output signal SB with a waveform of a graph $S_{B2}$ in FIG. 2 is generated therefrom. Comparing to the output SB1, the timings $t_{11}$ through $t_{14}$ for the SB1 are respectively shifted to timing $t_{21}$ through $t_{24}$ in the drawing. Accordingly, the positive pulse intervals of the output signal $S_B$ are shortened, while the negative pulse intervals thereof are lengthened so that the total lengthes of respective neighboring positive and negative pulses are kept unchanged. As a result, the cycle length of the output signal SB2 between the timings from $t_{21}$ to $t_{23}$ is remained in conveying the maximum cycle length 22T.

The maximum cycle length detector 16 then detects the the maximum cycle length 22T of the output signal $S_{B2}$, in spite of the unexpected level change of the reproduced signal $S_A$. Therefore, the drive motor controller 18 is able to keep the drive motor 19 in the prescribed the rotation speed at the CLV, without being affected by the level change of the reproduced signal $S_A$.

Figure 3:
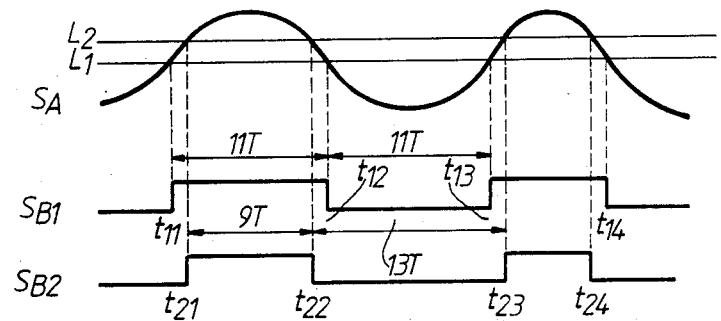

Here, to make clear the advantage of the above embodiment, the prior method disclosed in the aforementioned Japanese Patent Application Laid-Open No. 58-220271 is referred in using FIG. 3. In FIG. 3, respective graphs are identical with those in FIG. 2. However, a sliced output of a level slicer of the prior method has been examined its transition intervals by a maximum transition interval detecting means. The maximum transition interval detecting means is so constructed to examine transition intervals, i.e., for example, every positive or negative pulse length of the sliced output $S_{B1}$ and then detects a maximum transition interval. The sliced output $S_{B1}$ is assumed here that some positive pulse thereof conveys the maximum transition interval 11T. When the reproduced signal $S_A$ is lowered unexpectedly and a slice level L is assumed as if it being changed from a level $L_1$ to a higher level $L_2$, the sliced output $S_B$ is changed to a waveform $S_{B2}$ where the positive pulse is shortened. Then, the maximum transition interval detecting means fails to detect the maximum transition interval for the positive pulse at that time, in spite of the reproduced signal being of a correct bit rate.

Therefore, the prior method has had the trouble that the rotation speed of a drive motor in the CLV is wrongly controlled at the case of unexpected level change of the reproduced signal having occured.

The above description is given on a single prefered embodiment of the invention, but it will be apparent that many modifications and variations could be effected by one skilled in the art without departing from the spirit or scope of the novel concepts of the invention, so that the scope of the invention should be determined by the appended claims only.

What is claimed is:

1. A control apparatus for a recording medium drive motor in a digital information reproducing apparatus, comprising:
   motor means for driving a recording medium having a digital information recorded thereon in the form of a run length limited pulse code modulation;
   pick-up means for reproducing a digital signal from the recording medium driven by said motor means;
   means for detecting a predetermined limited cycle length of the digital signal from the reproduced signal by said pick-up means based on the time duration between level transitions in the same direction of said digital signal; and
   means for controlling the rotation speed of said motor means so that the limited run length of the reproduced digital signal is kept at a predetermined value.

2. A control apparatus for a recording medium drive motor in a digital information reproducing apparatus according to claim 1, wherein said motor means drives the recording medium in a rotation speed so as a relative speed between the recording medium and said pick-up means to be kept at a predetermined constant linear velocity.

3. A control apparatus for a recording medium drive motor in a digital information reproducing apparatus according to claim 2, wherein the limited run length is a maximum cycle length of the reproduced digital signal.

4. A control apparatus for a recording medium drive motor in a digital information reproducing apparatus according to claim 2, wherein the limited run length is a minimum cycle length of the reproduced digital signal.

* * * * *